Patented Apr. 7, 1936

2,036,577

UNITED STATES PATENT OFFICE 2,036,577

PROCESS OF PRODUCING RESINOUS MATERIAL SUITABLE FOR USE IN COMPOUNDING CHEWING GUM

George A. Hatherell, Roscoe, Calif., assignor to Frank A. Garbutt, Los Angeles, Calif.

No Drawing. Application July 6, 1934, Serial No. 733,988

5 Claims. (Cl. 99—135)

Chewing gums of the "chicle" type which are commonly sold on the market today are compounds containing considerable quantities of gum chicle or its substitutes. Such chewing gums are sufficiently plastic at temperatures around 95° F. to be readily chewed, and are produced by adding sugar, glucose, and flavoring matter to a gum base. A "gum base" may be considered as a chewing gum to which neither sugar, glucose, nor flavoring matter has been added. Gum bases should be practically tasteless and have about the same physical properties as the desired gum. They should also be of such a nature that they are not deleteriously changed by the addition of sugar, glucose, or flavoring matter.

The principal object of my invention is to produce a resinous material which, while itself not a satisfactory chewing gum base, can be later compounded with rubber or latex or other material to form such a base. The material produced by my invention is not in itself in such a condition that it can be chewed; in fact, it closely resembles a resin in its physical properties.

This new material may be compounded as described herein by combining a suitable latex gum with a suitable resin. The term "suitable latex gum" is used to denote those gums sold under the trade-names of Jelutong, Gutta Kay, Gutta Katiau, Hang Kang, Gutta Soh, Pontianak, etc., and their mechanical equivalents; that is, gums derived from coagulated latex, or the sap of trees, and having about the same physical properties as the gums named. It also includes materials formed or extracted from these latex gums and particularly materials which contain a portion of the resinous component of said gums.

The term "suitable resin" as used hereinafter denotes a resin that is liquid at a temperature which will not injuriously affect the latex gum used, and which will not go into solution in a boiling aqueous alkaline solution.

Resins which naturally have a rather high melting point may be used if they are first compounded with an oil or other softening agent to reduce their melting point. I have found it desirable to use resins which are liquid below 210° F. and I have found that a cumarone resin melting at about 150° F. is an excellent one to use.

The term "aqueous alkaline solution" as used hereinafter denotes a solution in water of any alkaline substance, such as caustic soda, which readily goes into solution in the water, and which is not poisonous at low concentrations. The degree of concentration of the alkaline substance in the solution does not seem critical, but I have found that an excellent solution for my purpose can be produced by adding to water about three-fourths of one per cent by weight of solid caustic soda.

The word "hot" as used hereinafter is used to denote a temperature that will melt the resin which is used without injuring the latex gum which is used and which is not sufficient to melt the latex gum. A temperature near the atmospheric boiling point of water (212° F.) will be found suitable, using the particular substances cited in the particular embodiment of my invention hereinafter described.

The gums commonly used in compounding chewing gum usually contain various impurities which give them either an objectionable taste or odor, and if used in chewing gum, considerable purification is necessary. I am informed that the larger chewing gum manufacturers who use considerable quantities of the latex gums in combination with chicle or by themselves find it necessary to subject the compounded bases or the individual gums to mastication in the presence of an alkaline solution, usually a solution of caustic soda in water.

The latex gums cannot be heated much above the atmospheric boiling temperature of water without rendering them permanently sticky or otherwise ruining them for use in chewing gum so that it is necessary to masticate the compounded base or the individual gums at temperatures well below the melting point of the gums, but while they are plastic. The mastication is carried on in large heavy machines which work the caustic soda solution thoroughly into the plastic mass, thus bringing it intimately into contact with all parts of that mass. As soon as the dissolving or/and the neutralization of the impurities is completed, the caustic solution is drawn off and the mastication continues in a stream of wash water which washes the caustic and impurities out of the gum.

The entire process of purification previously employed may take as long as thirty-three hours, requires the use of very heavy equipment, and is quite expensive and unless performed carefully under expert supervision, may result in spoilage of the gum or imperfect purification.

The mastication process is also undesirable since it leaves the treated material in the form of a mass in which water is mechanically entrained or mixed. This water must be removed before the additional ingredients needed to produce a commercial gum are added, and the removal is rather a slow and difficult process due to this mechanical entrainment of the water and due to the fact that the gum cannot be heated above the atmospheric boiling point of water without injury, thus necessitating prolonged vacuum or other drying.

I have discovered that a tasteless and odorless substance well suited for use in compounding chewing gum bases can be produced by the following process.

Any suitable latex gum (which may contain a considerable quantity of undesirable impurities and which is therefore quite cheap) is mixed with a suitable resin by agitation in hot caustic soda solution.

In the practice of the invention a hot caustic solution, preferably an unsaturated aqueous solution of caustic potash or soda, is raised to and maintained at or near boiling temperature. The resin is then added, being at once melted and being dispersed in the caustic by mechanical agitation so that it is in the form of dispersed droplets in the caustic solution. The aqueous alkaline solution, of course, acts expeditiously on the melted drops of resin, tending to dissolve those impurities which are soluble in alkaline solutions and which would otherwise go into solution in the mouth and perhaps produce a bad taste. The suitable latex gum broken into small pieces is then added, the mechanical agitation being continued and the temperature being maintained. The latex gum is, of course, not soluble in the caustic and taken alone is not liquid at or near the temperature of the boiling caustic. It is, however, soluble in the melted resin. As the latex gum is added it is taken into solution in the melted resin and due to the mechanical agitation the latex gum-resin solution is dispersed in the form of fine particles or shreds in the body of aqueous alkaline solution. The aqueous alkaline solution also acts on these shreds of gum-resin, dissolving therefrom the soluble impurities which would impart a bad taste to the gum as finally compounded. The amount of suitable latex gum used will vary with the particular latex gum employed. If Gutta Kay is used, about 20 parts by weight to 100 parts of resin will be found to be acceptable. If Jelutong or Hang Kang or any combination is used, a smaller proportion of gum may be desirable.

Agitation is then stopped and the material is allowed to stratify and excess caustic solution is decanted off. In practice, if I use 1600 pounds of caustic solution to 200 pounds latex gum-resin mixture, about 200 pounds of caustic solution remain in the gum after decanting. The kettle is then refilled with hot fresh caustic solution and agitation is resumed until the fresh caustic solution is thoroughly dispersed in the gum-resin mixture. Agitation is then stopped, the material stratifies, and excess caustic solution is decanted off.

The kettle is then filled with hot, clean water and agitation is resumed. As soon as the hot water is thoroughly dispersed in the gum, a weak caustic solution is produced by the admixture with the water of the residual caustic solution remaining in the gum after the second decanting.

A considerable proportion of the impurities in the gum is of an acid nature and these acids are largely converted into salts which with other impurities are removed by the caustic and wash water. If we remove 1400 pounds of caustic solution after the first caustic wash, we leave only 1/8 of these impurities in the gum-resin mixture after the first decanting. The second caustic wash and decanting leaves only 1/64 of these impurities. As a result, the weak caustic solution produced by adding clean water contains only a small percentage of these impurities.

The weak caustic solution formed by adding water to the gum-resin mixture after the second decanting is then slowly neutralized by the addition of an acid, the agitation being continued and the temperature being maintained. I have found that neutralization can be conveniently effected by pouring glacial acetic acid into the caustic solution carrying the resin-gum mixture, acid being added until the solution is substantially neutral. Other acids, such for example as sulphuric or hydrochloric acid, may be used either in concentrated form or as a dilute solution.

Before or after the neutralization the washing process may be repeated several times, each washing removing a portion of the impurities until any desired degree of purity is obtained. At a certain point in this neutralization (or with certain proportions of mixture prior to neutralization) a complete emulsification of the gum-resin in the caustic solution occurs. During this emulsification the mixture of latex gum and resin is reduced to very fine droplets uniformly distributed in the caustic solution so that a very complete contact is established between the latex gum-resin particles, the caustic solution, and the neutralizing agent which produces a very thorough neutralization. Alkali is held very tenaciously by the gums and it takes several hours of combined mastication and washing with clean water to wash the alkali out of the mass, using the methods now practiced by other gum manufacturers. I complete my neutralization in a few minutes.

As the neutralization proceeds, the small particles of latex gum-resin start to coagulate or agglomerate into larger masses. As soon as neutralization is complete the agitation is discontinued and the coagulated material settles so that most of the water containing the final products of purification and neutralization can be withdrawn.

The advantages of the above process are that it is much faster, and requires much less apparatus, than the mastication process. It also provides a much more complete purification. If the latex gum or resin contains particles of insoluble foreign matter, this matter is freed during the emulsification process and if any considerable amount of such material is present, it may be desirable to filter the gum-resin mixture while still emulsified and before coagulation.

While I prefer to conduct the treatment at atmospheric pressure, it is obvious that if it is desired to use a resin melting at a higher temperature than the atmospheric boiling point of water, the treatment must be conducted at pressures above atmospheric. This is perfectly feasible providing the temperature used is not sufficient to injure the gum or resin to be purified.

The purification of the materials is partly due to the chemical action of the caustic solution by which certain impurities are converted into compounds soluble in the caustic solution or in water, and partly a matter of washing; that is, dissolving and removing compounds which are soluble and which are found in the raw materials used.

The resulting product is a resinous substance which can be used in combination with chicle and other substances to produce an excellent chewing gum base free from taste and odor. It can, for example, be substituted for the purified resin introduced into the mixer shown in my Patent No. 1,887,930, dated November 15, 1932.

This application is a continuation in part of my application Serial 655,620, filed February 7, 1933.

I claim as my invention:

1. A process of preparing a resinous material suitable for use in a chewing gum base from a suitable latex gum and a suitable resin, which comprises: adding a suitable resin to an aqueous alkaline solution held at a temperature above that at which the resin melts, and allowing the resin to melt and become dispersed in the solution; adding small pieces of a suitable latex gum to the mixture of solution and resin under conditions that will cause the gum to be dispersed in the mixture, the temperature of the mixture being maintained above the melting point of the resin during this dispersion; removing from the mixture of resin and gum the water soluble and other reaction products produced by the action of the alkaline solution; and neutralizing the solution by the addition of acid to said mixture.

2. A process of preparing a resinous material suited for use in a chewing gum base from a suitable gum and any suitable resin, which comprises: adding resin to an aqueous alkaline solution held at a temperature above that at which the resin melts, and allowing the resin to melt and become dispersed in the solution; adding small pieces of gum to the mixture of solution and resin under conditions that will cause the gum to be dispersed in the mixture, the temperature of the mixture being maintained above the melting point of the resin during this dispersion; washing out the reaction products produced by the action of the aqueous alkaline solution on the resin and gum; neutralizing the solution by the addition of acid to said mixture; and removing from the mixture of resin and gum the water soluble and other reaction products produced by the action of the alkaline solution and the acid.

3. A process of preparing a resinous material suited for use in a chewing gum base from any latex gum and any suitable resin, which comprises: adding resin to an aqueous alkaline solution held at a temperature above that at which the resin melts, and allowing the resin to melt and become dispersed in the solution; adding small pieces of latex gum to the mixture of solution and resin under conditions that will cause the latex gum to be dispersed in the mixture, the temperature of the mixture being maintained above the melting point of the resin during this dispersion; washing the resin-gum mixture to remove impurities therefrom; and neutralizing the solution by the addition of acid solution to said mixture.

4. A process of producing a resinous material suitable for use in a chewing gum base, which comprises: forming a dispersion of suitable resin in an aqueous alkaline solution maintained at a temperature above the melting point of the resin; dispersing pieces of a suitable gum in the resin dispersion previously formed, the temperature of said dispersion being maintained at a temperature below the melting point of the gum during the dispersion of said gum; and neutralizing the alkali component of said solution.

5. A process of producing a resinous material suitable for use in a chewing gum base, which comprises: forming a dispersion of suitable resin in an aqueous alkaline solution maintained at a temperature above the melting point of the resin; dispersing pieces of a suitable latex gum in the resin dispersion previously formed, the temperature of said dispersion being maintained at a temperature below the melting point of the latex gum during the dispersion of said latex gum; washing the material so produced to remove impurities therefrom; neutralizing the alkali component of said solution; and removing the water component of the material.

GEORGE A. HATHERELL.